Dec. 27, 1932. J. J. HESS 1,891,928
OPEN BOTTOM VENTILATED PAPER TRAY
Filed Sept. 26, 1929
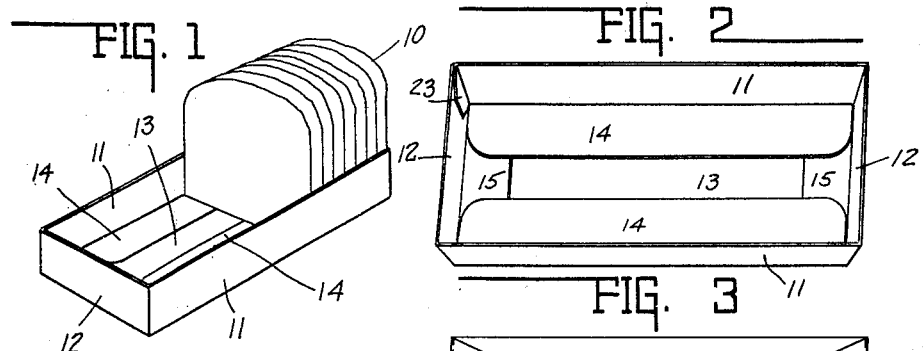
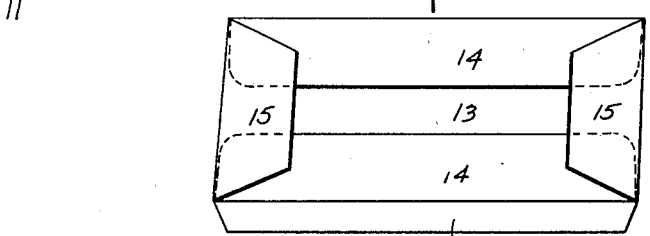
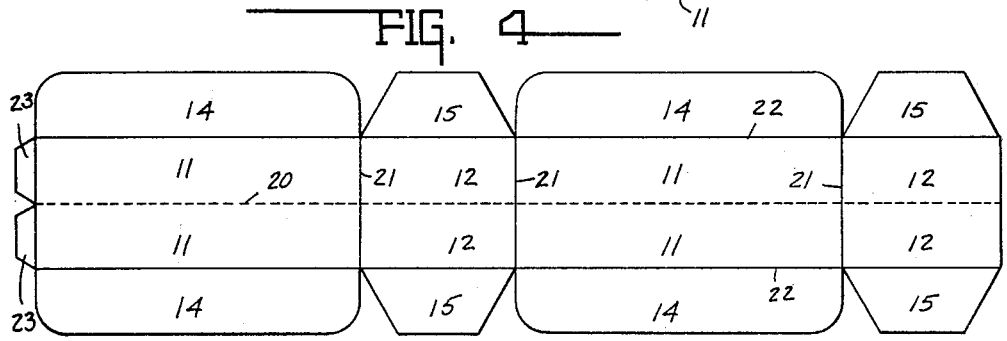
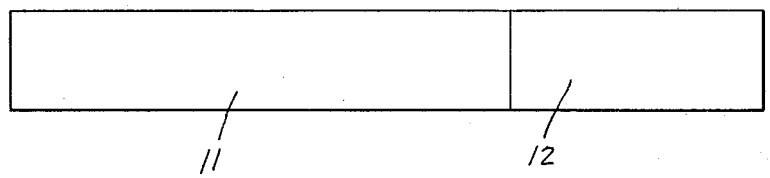
INVENTOR.
JOSEPH J. HESS.
BY Lockwood Lockwood
Goldsmith & Galt
ATTORNEYS.

Patented Dec. 27, 1932

1,891,928

UNITED STATES PATENT OFFICE

JOSEPH J. HESS, OF INDIANAPOLIS, INDIANA, ASSIGNOR TO INTERNATIONAL PRINTING COMPANY, A CORPORATION OF INDIANA

OPEN BOTTOM VENTILATED PAPER TRAY

Application filed September 26, 1929. Serial No. 395,272.

This invention is an open bottom paper tray for receiving or packaging bread and other bakery products. The usual trays made of paper and the like, now and heretofore used, have closed bottoms so that the bottom absorbs some of the moisture from the bottom of the bread or other contents which is objectionable, and it does not allow uniform seasoning of the product, as the top and sides of the prior trays are open and the bottom is closed. By "seasoning" here is meant what happens to bakery products between the time of baking and the time of use. Also, a closed or solid bottom is in direct contact with the goods contained by the tray and often imparts an odor to the goods.

The object of this invention is to overcome the foregoing difficulties and provide a tray which will permit uniform seasoning of the product and prevent imparting odors to the contents. This is largely accomplished by providing a large ventilating opening or ample ventilation in the bottom of the tray and which, when the goods and tray are wrapped, furnishes an air space between the wrapping and the bottom of the contents, as well as at the sides, ends and top thereof.

Another feature of the invention is the economy of production of this tray, as it is made of one piece of paper material and has but one seal at one corner and its arrangement and construction lends itself to quantity production as well as an appreciable saving in stock. Thus, 25,000 of them can be made in the time required to make 1,500 trays nearest to this type of tray. Also, said paper tray can be collapsed instantly and flattened to a very thin, small strip for convenient and economical packing and shipping.

The full nature of the invention will be understood from the accompanying drawing and the following description and claims:

In the drawing Fig. 1 is a perspective view of my new tray half full of sliced bread or the like. Fig. 2 is a perspective top view of the tray with nothing in it. Fig. 3 is a perspective bottom view of the tray. Fig. 4 is a view of a double blank for a pair of trays. Fig. 5 is a plan view of a tray in collapsed form for shipping. Fig. 6 is an edge view of the tray shown in Fig. 5.

The tray shown in the drawing herein is adapted for holding or packaging bread 10, in loaf form or in sliced form, or other bakery products. The tray is such that the bread or contents is held in position but with the major portion of the surface thereof exposed to the atmosphere. This is desirable because of the seasoning of the bread after it is baked and before it is used. Opportunity must be provided to permit as much evaporation of moisture as possible and yet prevent uneven seasoning thereof or the imparting of disagreeable odors thereto.

The tray is made of paper stock having some stiffness and has sides 11 and ends 12 which are not very high, as for loaf or sliced bread its height is not much more than one-third of the height of the contents. It is rectangular in form and is usually about the size adapted to receive a loaf of bread. There is a ventilating opening 13 in the bottom extending substantially for the length of the tray. To form this, there are narrow bottom members 14 adjacent the sides 11 as shown, and which are spaced appreciably from each other, and bottom end flaps 15 at the ends thereof, but they do extend only far enough to reenforce the ends of the bottom strips 14. Hence between bottom side and end flaps 14 and 15 a rather long and wide ventilating opening is provided.

This tray is preferably made from paper stock, as illustrated in Figs. 4, 5 and 6. As seen in Fig. 4 a double blank is first cut, which has a longitudinal separating line 20, and the two halves of the blank are similar and, when separated, form blanks for two individual trays. Vertical score lines 21 separate the sides 11 and ends 12 from each other and the longitudinal score line 22 separates the bottom and end members 14 and 15 from the sides 11 and ends 12, and a uniting tab 23 is formed on the exposed end of one of the side members 11.

After the double blank shown in Fig. 4 has been formed, the two halves are separated on the line 20 and each half constitutes a complete blank for a tray. Each tray blank is then formed into a tray, as shown in Fig. 2, and the uniting tab 23 is glued or otherwise secured to the adjacent end member 12, and that completes the tray, the bottom side flaps 14 being turned inward and the bottom end flaps 15 being also turned inward under the bottom flaps 14.

For shipment all that is necessary to do to the tray is to turn the bottom flaps 14 and 15 upward against the sides and ends 11 and 12 and then collapse the tray into the form shown in Figs. 5 and 6 which show the collapsed tray with the length of one side and end members and with the adjacent bottom members lying flat between them. This collapsed form of the tray is extremely thin, only four thicknesses of the paper material and the length of it is only that of one side plus one end and the width is that of a side wall 11. Many of these collapsed trays superimposed form one bundle that is light and small for shipment.

The user takes a collapsed tray as shown in Figs. 5 and 6 and in a second forms the tray as shown in Fig. 2 by merely changing the angle at the corners to right angles and turn down the bottom flaps to horizontal position and the tray is ready to receive the bread or other bakery product. The ends of the bottom flaps 14 are at their corners slightly rounded merely for the purpose of preventing the corners from becoming malformed in the manipulation of the tray, but each end of the bottom flaps 14 has considerable width that abuts against the ends 12, so as to maintain the rectangular form of the tray, when the bottom flaps 14 and 15 are in the horizontal position as shown in Figs. 2 and 3. Preferably the end bottom members 15 lie under the bottom members 14 of the tray. This renders the tray strong and capable of maintaining its rectangular form.

This paper tray is very cheaply and easily formed, shipped and manipulated for receiving and holding bread, either in the solid loaf or sliced loaf form, or other bakery products. The open bottom will provide permanent ventilation which will help to produce uniform seasoning of the bread and avoid the undesirable results of packaging bread and other bakery products in paper trays with closed bottoms. This tray will permit air to get to the bottom of the loaf or other product and will greatly reduce any flavor imparted to the loaf. Bread has a tendency to mold, as the moisture and material in it gives a fertile field for mold to grow, and sliced bread molds more rapidly than unsliced bread, and this tendency is increased by placing the bread in a baker's tray with closed bottom. The ventilated paper tray herein shown will permit more circulation of air and tend to cut down the heating effect produced by the contact of the loaf with the tray.

The invention claimed is:

1. A rectangular elongated paper tray for sliced bread and other bakery products, having no top and with relatively low side and end walls flexibly connected at the corners, and with longitudinal side bottom flaps flexibly connected with the side walls and inturned toward each other and appreciably spaced apart, and with end bottom flaps independent of the side bottom flaps and flexibly connected with the end walls and inturned and secured to the side bottom flaps, said flaps being of a width materially less than one half the length of the wall adjacent the flap supporting wall, whereby there is an appreciable, elongated ventilating space in the bottom of the tray for the greater portion of its length.

2. A blank for a paper tray for sliced bread and other bakery products, consisting of a single strip of paper material with consecutive and alternate end and side sections with scored division lines for the corners, and a series of relatively narrow bottom side flaps and bottom end flaps and spaced apart an appreciable distance, each bottom side flap being in scored connection with a side section, and each bottom end flap being in scored connection with an end section, and the length of the bottom end flaps being more than twice the width of a bottom side flap and adapted to be inturned and secured to the bottom side flaps, whereby there will be formed an appreciable, elongated ventilating space in the bottom of the tray for the greater portion of its length when the tray is formed, the width of the side and end sections and the side and end bottom flaps being of substantially uniform width, whereby the blank can be folded into a strip form for handling and shipping that has a length one-half and a width one-fourth of said blank before it is folded.

3. A blank for a pair of trays for sliced bread and other bakery products, consisting of a single strip of paper material with a central longitudinal score line for separating the double blank into single blanks when desired, a series of consecutive and alternate end and side sections with scored division lines for the corners, said series being adjacent to each other on opposite sides of the score line, and a series of relatively narrow bottom side flaps and bottom end flaps for each series and spaced apart and at each side edge of the blank remote from the score line, each bottom side flap being in scored connection with one of said side sections and each bottom end flap in scored connection with one of said end sections, and the length of the bottom end flaps in each series being more than twice the width of each bottom side flap and adapted to be inturned and secured to the longitudinal bottom flaps, whereby there will be formed an appreciable, elongated ventilating space in the bottom of each tray for the greater portion of its length when the tray is formed, all of said side and end sections and the bottom flaps being substantially uniform in width, whereby the blank can be folded into a strip form for handling and shipping that has a length one-half and a width one-fourth of said double blank before it is folded.

In witness whereof, I have hereunto affixed my signature.

JOSEPH J. HESS.